United States Patent [19]

Sumi et al.

[11] Patent Number: 4,649,052

[45] Date of Patent: Mar. 10, 1987

[54] METHOD FOR PRODUCTION OF GARLIC PASTE

[75] Inventors: Naoki Sumi; Hiroshi Yamashita, both of Kanagawa; Yasuo Sekizuka, Tokyo, all of Japan

[73] Assignee: Meiji Seika Kaisha, Ltd., Tokyo, Japan

[21] Appl. No.: 743,208

[22] Filed: Jun. 10, 1985

[30] Foreign Application Priority Data

Jun. 11, 1984 [JP] Japan ................................. 59-118173

[51] Int. Cl.$^4$ ...................... A23L 1/214; A23L 1/221
[52] U.S. Cl. .......................................... 426/49; 426/52; 426/638
[58] Field of Search ............................ 426/49, 52, 638

[56] References Cited

U.S. PATENT DOCUMENTS

| | | | |
|---|---|---|---|
| 2,618,561 | 11/1952 | Spinka et al. | 426/49 |
| 2,760,869 | 8/1956 | Janich | 426/49 |
| 3,424,593 | 1/1969 | Bockman | 426/49 |

FOREIGN PATENT DOCUMENTS

| | | | |
|---|---|---|---|
| 0094049 | 8/1978 | Japan | 426/49 |
| 58-32578 | 7/1983 | Japan . | |
| 0002670 | 1/1984 | Japan | 426/49 |

*Primary Examiner*—Jeanette Hunter
*Attorney, Agent, or Firm*—Sughrue, Mion, Zinn, Macpeak & Seas

[57] ABSTRACT

A method for the production of non-odorous garlic paste is disclosed. This method comprises (i) subjecting garlic bulbs as wrapped in the skin to a heating treatment, adding water to the garlic bulbs, coarsely crushing the garlic bulbs, and separating the skin and the unwanted part of garlic bulbs from the resultant crushed mass of garlic and leaving behind a garlic clove-containing liquid, (ii) heating the clove-containing liquid together with vitamin $B_1$, rice bran, or yeast added thereto, (iii) heating the resultant blend in the presence of a cellulase or in the absence of the cellulase thereby obtaining a mixture, and (iv) heating either the liquid part of the mixture resulting from the removal of solids therefrom or the mixture in its unmodified form together with soybean flour, soybean milk, or soybean milk flour.

The cellulase used in this method is produced by a microorganism belonging to genus Trichoderma or the genus Aspergillus.

4 Claims, 4 Drawing Figures

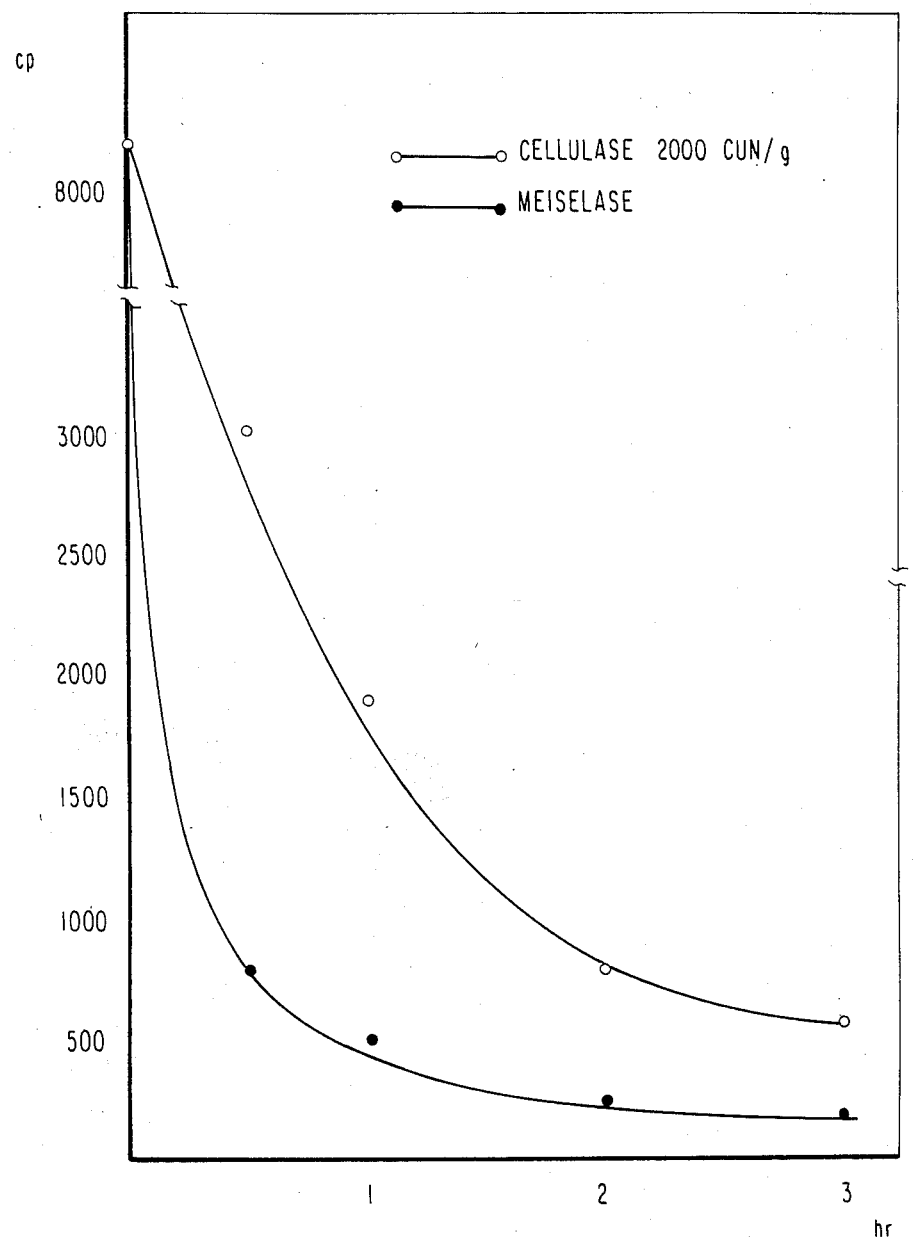
FIG. 2 TIME-COURSE CHANGE OF VISCOSITY DUE TO ADDITION OF CELLULASE

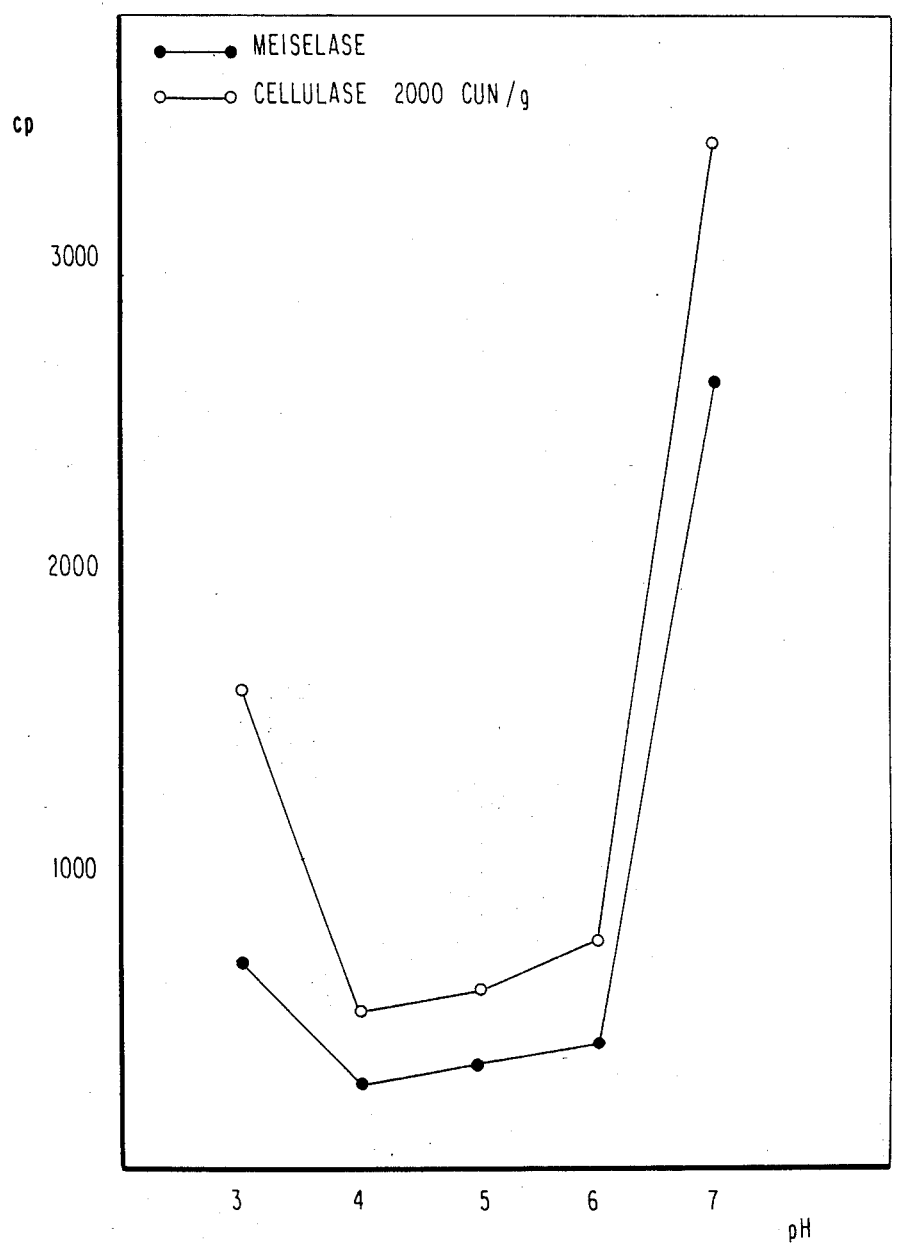
FIG.3 RELATION BETWEEN pH AND VISCOSITY DUE TO ADDITION OF CELLULASE

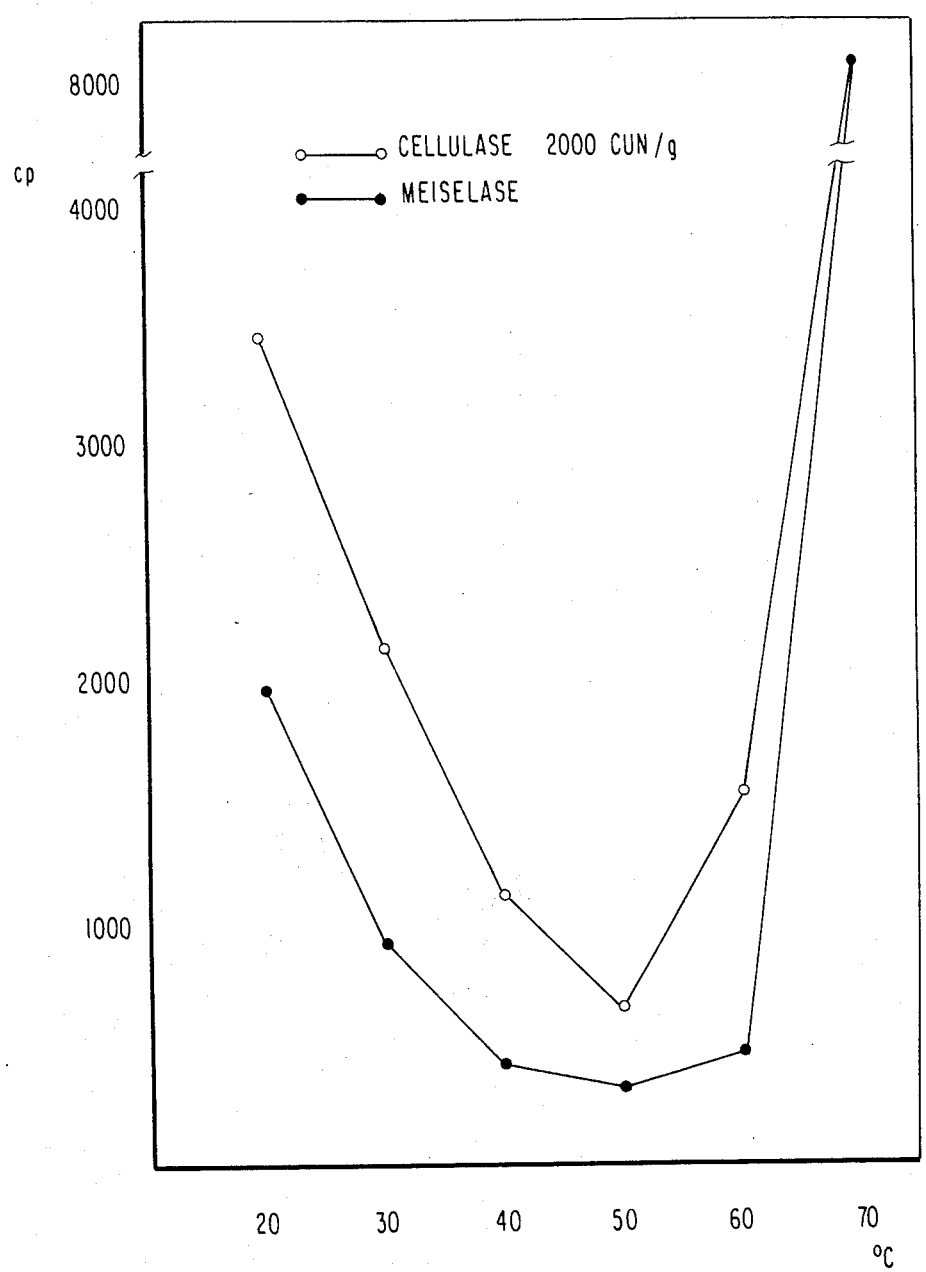
FIG. 4  RELATION BETWEEN TEMPERATURE AND VISCOSITY DUE TO ADDITION OF CELLULASE

METHOD FOR PRODUCTION OF GARLIC PASTE

FIELD OF THE INVENTION

This invention relates to a method for the production of garlic paste.

Garlic (*Allium sativum* L.) emits an irritating odor when it is peeled and then minced or ground. In accordance with the present invention, non-odorous garlic paste can be obtained from raw garlic by conducting a specific sequence of method steps.

BACKGROUND OF THE INVENTION

Heretofore, a method for obtaining non-odorous garlic in powdery form has been described in Japanese Patent Publication 32578/83, which comprises finely crushing garlic bulbs with a cutter, extracting the crushed garlic bulbs with an alcoholic aqueous solution, removing allicin from the extract of garlic, combining the resultant extract with soluble or insoluble soybean protein of an amount of from 1 to 5 times the amount of the extract, stirring the resultant mixture thereby entrapping a sulfer-containing odorous component therein, and thereafter drying the blend formed.

Since the method requires raw garlic bulbs to be finely crushed with a cutter in the first step, the irritant odor issuing from the garlic is extremely sharp, and therefore, the alcohol extract of crushed garlic still retains an extremely intense irritant odor.

Further, since the soybean protein is added in a large amount to the extract for the purpose of entrapping the odorous component, the resultant moist solid blend is produced before it is dried. However, it inevitably must be dried, because the moist solid is difficult to handle in the subsequent use thereof.

Moreover, the product obtained by this method has an excessively high soybean protein content. When this product is subsequently used as a condiment, it undergoes an undesirable phenomenon of coloration.

SUMMARY OF THE INVENTION

This invention aims to overcome the various drawbacks mentioned above and provide a method for the production of non-odorous garlic paste without entailing any emission of the irritant odor of garlic during the course of the production.

More specifically, this invention is directed to a method for the production of garlic paste, comprising the steps of (i) subjecting garlic bulbs as wrapped in the garlic skin to a heating treatment, adding water to the garlic bulbs, coarsely crushing the garlic bulbs, and separating the skin and other unwanted parts of garlic bulbs from the resultant crushed mass of garlic and leaving behind a garlic clove-containing liquid, (ii) heating the clove-containing liquid together with vitamin $B_1$, rice bran, or yeast added thereto, (iii) heating the resultant blend in the presence of a cellulase or in the absence of cellulase to thereby obtain a mixture, and (iv) heating either the liquid part of the mixture resulting from the removal of solids therefrom or the mixture in its unmodified form together with soybean flour, soybean milk, or soybean milk flour.

The other functions and characteristic features of this invention will become apparent from the further disclosure of the invention hereinbelow with reference to the accompanying drawings.

BRIEF DESCRIPTION OF THE DRAWINGS

FIG. 2 is a graph showing variations of viscosity of a garlic clove-containing liquid along the course of time due to addition of a cellulase to the liquid as compared with addition of Meiselase (a commercially available enzyme composition, described in more detail hereinafter).

FIG. 3 is a graph showing the relation between pH and viscosity as observed in a garlic clove-containing liquid due to addition of a cellulase to the liquid as compared with addition of Meiselase.

FIG. 4 is a graph showing the relation between temperature and viscosity as observed in a garlic clove-containing liquid due to addition of a cellulase to the liquid as compared with addition of Meiselase.

DETAILED DESCRIPTION OF THE INVENTION

Figure 1:
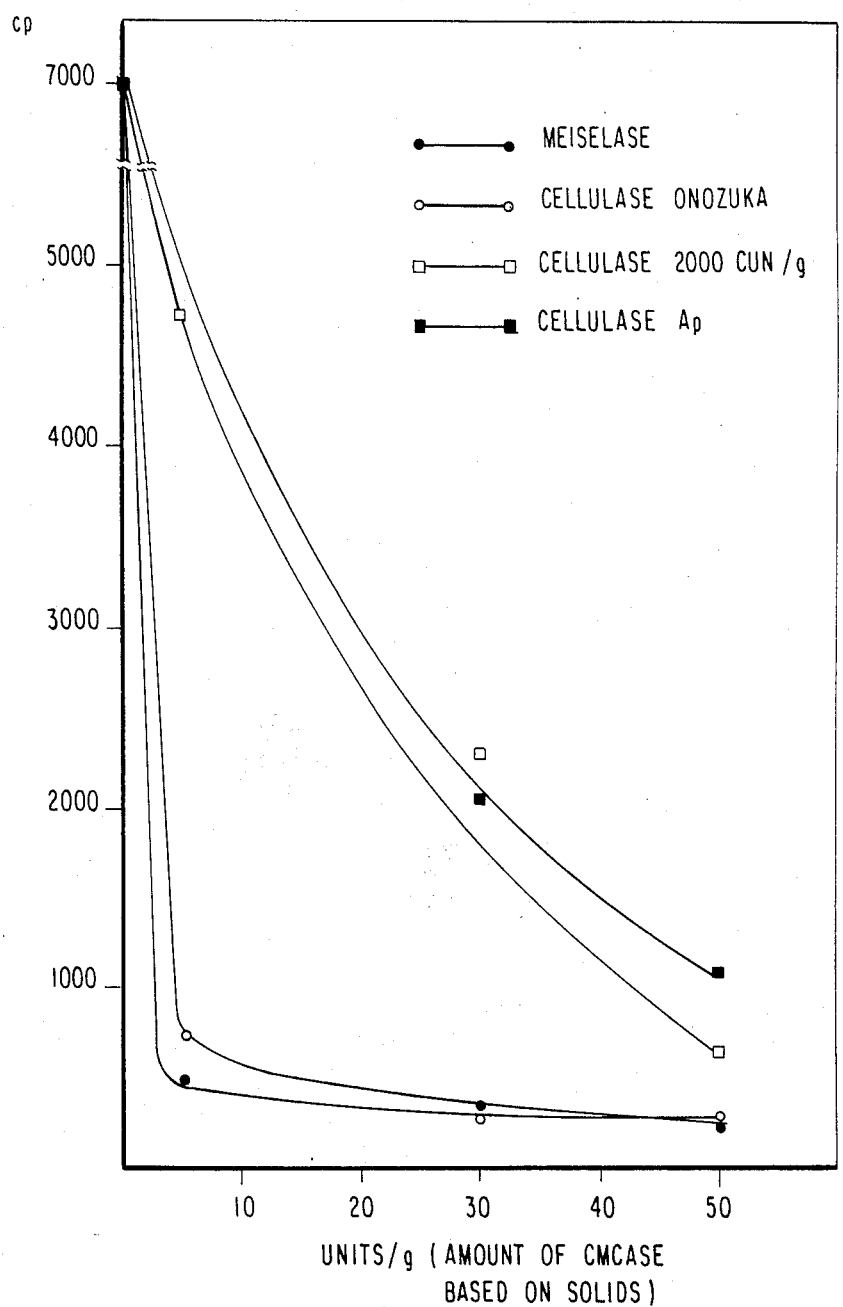
FIG. 1 is a graph showing degrees of loss of viscosity of a garlic clove-containing liquid due to addition of cellulases of varying species to the liquid.

The garlic to be used in the present invention is in the form of garlic bulbs wrapped in the skin thereof. When the garlic in that form is treated with steam or hot water, or is exposed to microwaves, alliinase therein is inactivated in an extremely short span of time. The garlic bulbs while wrapped in the skin does not expose the garlic cloves to the ambient air, and therefore emission of the irritant odor of garlic is avoided. When the garlic bulbs are stripped of the skin and are minced, they immediately emit the irritant odor peculiar to garlic because alliin, one of the components of garlic, is decomposed by activated alliinase into allicin.

As the heating means for precluding the emission of the irritant odor peculiar to garlic, any of the treatment with steam, the treatment with hot water, or the exposure to microwaves is suitable. The present invention can be applied in the case of any of these heating means. The heating is preferably carried out at a temperature in the range of 99° to 120° C. If this temperature is lower than 99° C., the garlic bulbs still tend to emit the irritant odor during the subsequent step of peeling and coarse crushing. If the temperature exceeds 120° C., the garlic itself tends to assume a brown color and this brown color persists in the garlic paste as a finished product and impairs the appearance of the product.

The heating treatment can be effected by placing the garlic bulbs as wrapped in the skin in an autoclave or retort and steaming them at a temperature not exceeding 120° C. under application of pressure, or by placing them into boiling water. Alternatively, the heating treatment may be accomplished by exposing the garlic bulbs wrapped in the skin to microwaves of a frequency of 2,450 MHz (this frequency value is permitted under the Radio Law in Japan). The exposure to microwaves is carried out in a manner, for example, that 300 g of garlic bulbs wrapped in the skin is exposed to microwaves at a frequency of 2,450 MHz and an output of 1 kw for about 3 minutes. When the garlic bulbs wrapped in the skin are exposed to microwaves, water contained in the garlic bulbs is activated and boiled and, thus, garlic bulbs can be heated. If the exposure to the microwaves is carried out in a dry atmosphere, the garlic itself is dried and is quickly scorched. The atmosphere, therefore, is desired to be saturated with steam in advance of the exposure. In other way, the garlic bulbs wrapped in the skin is sprayed with water and then exposed to microwaves.

To the garlic bulbs which have undergone the heating treatment described above, water is added, preferably in an amount by weight of from 0.3 to 2 times the amount by weight of the garlic bulbs prior to the heating treatment (i.e., garlic bulbs wrapped in the skin). If the amount of water added is less than 0.3 time the amount of the garlic bulbs wrapped in the skin, the clove tends to be produced in poor yield due to that a part of the produced clove is miscible with and passes into the skin and the roots and bottoms of the garlic bulbs discarded as waste after the coarse crushing, the treatment with a finisher for separation, or the treatment with a strainer in a subsequent step. If the amount of water exceeds 2 times the amount of the garlic bulbs, the energy required in heating, and possibly in concentrating and drying, the resultant blend in the subsequent step tends to be undesirably large. Any increase of the amount of water so added does not result in an increase in the yield of the garlic clove (also referred to herein simply as "clove"). The meshes in the aforementioned finisher or strainer to be used in the treatment preferably fall in the range of 1 to 3 mm. If the mesh size is less than 1 mm, the yield of the clove is generally not sufficient. If it exceeds 3 mm, the skin and the roots and bottoms which are desired to be discarded as waste will tend to penetrate and mingle with the separated clove.

The clove-containing liquid obtained in consequence of the treatment in the preceding step together with vitamin $B_1$, rice bran or yeast added thereto are stirred and heated, preferably at 60° to 70° C., to further decrease the peculiar odor of garlic still persisting in the clove. In this heating step (ii), one of vitamin $B_1$, rice bran and yeast is added to the clove-containing liquid, but an addition of a mixture thereof is not suitable since the undesirable mixed odor thereof persists in the finished product.

In the addition of vitamin $B_1$ to the clove-containing liquid, a hydrochloride salt of vitamin $B_1$ is used for facilitating the solution. This salt is added preferably in an amount of about 0.001 to 0.005 wt% based on the amount of garlic bulbs wrapped in the skin. Although the deodorizing effect of the added vitamin $B_1$ increases with the increasing amount of vitamin $B_1$ added, the taste of vitamin $B_1$ persists, and renders the finished product bitter if the amount exceeds 0.005 wt%. If the amount is less than 0.001 wt%, the deodorizing effect is not manifested.

In the treatment with vitamin $B_1$ described above, the effect in decreasing the odor of garlic becomes conspicuous when the heating treatment is carried out at a temperature in the range of 60° to 70° C. at a pH value of about 8. After the heating treatment, the pH value of the liquid under treatment is returned to a range of from 7 to 6 to prepare the liquid for the subsequent step.

When rice bran is added to the clove-containing liquid, it is added preferably in an amount of from about 0.5 to 2.5% by weight based on the amount of garlic bulbs wrapped in the skin. If the amount of rice bran so added exceeds 2.5% by weight, the fractionation by centrifugal separation in the subsequent step is difficult to attain, the yield of the product is low, and the odor of rice bran persists in the finished product. If this amount is less than 0.5% by weight, the deodorizing effect aimed at is not obtained.

When yeast is added to the clove-containing liquid, it is added preferably in an amount of from 1% to 3% by weight based on the amount of the garlic bulbs wrapped in the skin. If the amount of yeast so added exceeds 3% by weight, the taste of the yeast stands out in the finished product. If this amount is less than 1% by weight, the deodorizing effect the yeast is expected to bring about is not obtained.

Next, a cellulase is added to the clove-containing liquid obtained by the treatment described above and the resulting mixture is stirred and heated at a temperature in the range of 40° to 60° C., thereby the cellulase reacts upon the liquid and consequently lowers the viscosity of the liquid significantly (refer to Comparative Experiment 5 hereinafter). If the temperature deviates from the range mentioned above, there is the possibility that the viscosity will be increased so much as to render the treatment of concentration and/or pulverization difficult. If the temperature exceeds 60° C., the cellulase tends to be inactivated.

The cellulase can be produced, e.g., by *Aspergillus niger*, *Trichoderma koningi*, or *Trichoderma viride* (refer to Comparative Experiment 2). The enzymatic activity of the cellulase is expressed in the units of carboxymethyl cellulase (CMCase) activity per g of solids of the clove. The unit activity is such as to form reducing sugar equivalent to 0.01 mg of glucose from carboxymethyl cellulose per minute. The value of the expected viscosity is not more than about 1,500 cp. When the cellulase obtained from a microorganism belonging to the genus Trichoderma is used, the amount of the cellulase added to the clove-containing liquid is at least about 5 units per g of the solids of the clove-containing liquid. When the cellulase obtained from a microorganism belonging to the genus Aspergillus is used, the amount of the cellulase added to the clove-containing liquid is at least about 50 units per g of the solid of the clove-containing liquid. When cellulase is used in the amounts above, the viscosity can be decreased to the expected value (i.e., not more than 1,500 cp, see Comparative Experiment 2). The duration of the cellulase reaction is required to be not less than 1 hour (refer to Comparative Experiment 3 hereinafter). The optimum working pH value of the enzyme falls in the range of 4 to 6. The desired decrease of the viscosity tends not to be fully obtained if the pH value deviates from the range just mentioned (refer to Comparative Experiment 4 hereinafter).

The clove-containing liquid of lowered viscosity obtained as described above and soybean milk flour or soybean flour added thereto in an amount of preferably from about 1 to about 10% by weight, more preferably from about 1 to about 8% by weight, most preferably about 4% by weight, based on the solids of the clove-containing liquid are heated to a temperature of about 60° C. By this treatment, the trace of the odor of garlic persisting in the clove-containing liquid is thoroughly removed (refer to Comparative Experiment 6 hereinafter). The soybean flour used for this purpose may be in a form obtained by grinding raw soybeans. Optionally, the soybeam flour so produced may be further subjected to a heating treatment prior to use. If the heating treatment is carried out at a temperature exceeding 80° C., the soybean liberates soluble matter and the flavor of the finished product is adversely affected.

Subsequently, the liquid obtained consequently is preferably homogenized with a plain homogenizer or a pressure homogenizer to provide non-odorous garlic paste.

On the other hand, in the case of the absence of the cellulase, the clove-containing liquid to which vitamin $B_1$, rice bran, or yeast has been added as described above is divided by centrifugal separation into a liquid part and a sediment part. The liquid part so obtained and soybean flour, soybean milk, or soybean milk flour added thereto are heated to a temperature of up to about 80° C., and preferably about 60° C. The resultant mixture is again divided by centrifugal separation into a liquid part and a sediment part. In this case, the deodorizing effect is particularly conspicuous when the temperature is at a level of about 60° C. If this temperature exceeds 80° C., the unpleasant odor is perceived. The soybean flour, soybean milk or soybean milk flour to be used in this step is desired to have undergone a thermal treatment with steam for denaturation. The amount of addition thereof is preferably from about 1 to about 20% by weight, more preferably from about 1 to about 15% by weight, most preferably about 4 to 8% by weight, based on the dry weight of the clove-containing liquid, thereby removing the trace of odor of garlic still persisting in the liquid. If the amount of soybean flour added is less than 1% by weight or that of soybean milk (based on the dry weight) or soybean milk flour added is less than 2% by weight, thorough removal of the persisting odor cannot be obtained.

Subsequently, the mixture is devided with the centrifugal separator into solid and liquid.

In the non-odorous galic paste obtained as described above, the flavor and favorable taste inherently possessed by garlic remains intact, but the irritant odor of garlic emitted during normal treatments of garlic is not emitted at all.

When the non-odorous garlic paste obtained by the present invention is diluted with sugar solution or carbonated water and sugar solution, therefore, there is obtained a delicious non-odorous nutritious drink. The non-odorous garlic paste also is suitable for incorporation in sauce for roast meat, dressing, garlic butter, garlic salt, and kimchi sauce. This garlic paste can also be used for flavoring candies, snacks, rice cracker, etc. The non-odorous garlic paste can be converted by freeze drying, foam mat drying, or spray drying into a powder for convenience of handling.

The present invention is described more specifically below with reference to working examples.

EXAMPLE 1

A 1,000 g bunch of garlic bulbs wrapped in the skin was washed with cold water, placed in a gauze basket, set in place in a retort, and heated at 110° C. for 10 minutes. After the heating treatment, the bunch of garlic bulbs, still held in the basket, was cooled by being kept in running water, and was then drained. Thereafter, the garlic was dropped into 1,500 g of cold water and by the use of a finisher designed for squeezing juice from fruits, divided into a clove-containing liquid and unwanted portions of garlic bulbs, i.e., the skin and the roots and bottoms of the garlic bulbs. Consequently, the clove-containing liquid was obtained in a total amount of 2,000 g.

The clove-containing liquid was mixed with 40 mg of hydrochloride of vitamin $B_1$. The resultant mixture was adjusted to a pH of 8 with an aqueous solution of 10% by weight sodium hydroxide and stirred over a hot water bath at 60° C. for 40 minutes. Thus, the mixture was neutralized to pH 7 with an aqueous solution of 36% by weight of hydrochloric acid. After the neutralization, the mixture was divided into a liquid and solids by the use of a centrifugal separator. The liquid thus obtained by the separation in an amount of 1,200 g was mixed with 36 g of soybean flour prepared in advance by boiling soybeans with steam and drying and comminuting the boiled soybeans. The resultant mixed solution was heated until the temperature reached 60° C. Subsequently, the solution was again centrifugally separated to produce 1,000 g of garlic paste.

The garlic paste, by measurement with a portable refractometer, was found to possess a refractive index of 11. When this garlic paste was concentrated with a rotary evaporator under 25 Torrs at 60° C., there was obtained delicious non-odorous garlic extract, which was found with the aforementioned refractometer to possess a refractive index of 70.

A mixture consisting of 1% by weight of the aforementioned non-odorous garlic extract, 43% by weight of starch syrup, and 56% by weight of sugar was boiled at 145° C. and then molded to form candies in a conventional manner. These candies emitted no odor, but gave forth the flavor and favorable taste of garlic.

Separately, garlic paste as a comparative sample was obtained by following the procedure described above, except that the heating treatment was omitted, and the addition of vitamin $B_1$ and that of soybean flour were both omitted. Candies were similarly produced by using the garlic paste. The two kinds of candies were subjected to sensory test. The ratings in the test were made on the following scale.

Scale of Rating (odor of garlic)

2: Intense odor of garlic perceived.
1: Strong odor of garlic perceived.
0: Odor of garlic easily perceived.
−1: Odor of garlic barely perceived.
−2: No odor of garlic perceived.

A panel of 18 members rated the candies as shown in the following Table 1. The candies of the present invention were concluded to be free from odor at a level of significance of 5%.

TABLE 1

| | Odor of Garlic | |
|---|---|---|
| Panel Member | Candies Containing Odorous Garlic Paste | Candies Containing Non-Odorous Garlic Paste of This Invention |
| 1 | 2 | 0 |
| 2 | 2 | 1 |
| 3 | 2 | 0 |
| 4 | 2 | −1 |
| 5 | 2 | 0 |
| 6 | 2 | 0 |
| 7 | 2 | −1 |
| 8 | 2 | 0 |
| 9 | 2 | 0 |
| 10 | 2 | 1 |
| 11 | 2 | 1 |
| 12 | 2 | 0 |
| 13 | 2 | 1 |
| 14 | 2 | 0 |
| 15 | 2 | 0 |
| 16 | 2 | 0 |
| 17 | 2 | 0 |
| 18 | 2 | 0 |

EXAMPLE 2

A 1,000 g bunch of garlic bulbs wrapped in the skin was placed in an electronic oven operated at a frequency of 2,450 MHz and an output of 3.5 kw together with a glass container holding water for saturating the oven interior with steam. The electronic oven was operated to irradiate its contents with microwaves for 3 minutes. Then, the garlic so treated was dropped into 1,600 g of cold water and treated with a finisher similarly to Example 1 to divide the treated garlic into the unwanted portions of garlic bulbs, i.e., the skin and the roots and bottoms of garlic bulbs, and a clove-containing liquid. Thus, the clove-containing liquid was obtained in an amount of 2,200 g. On a hot water bath, 2,200 g of the clove-containing liquid and 30 g of yeast obtained by culture on a medium of whey were heated at 60° C. for 60 minutes at a pH of 8. After adjusting the pH to 6, the resultant mixture was divided with a centrifugal separator into solids and a liquid. Thus, the liquid was obtained in an amount of 1,300 g.

This liquid and 36 g of the same soybean flour as used in Example 1 were stirred and heated until the temperature of the resultant mixture reached 60° C. The mixture was subsequently divided with the centrifugal separator into solids and a liquid. Consequently, 1,100 g of garlic paste was obtained which, by measurement with a portable refractometer, was found to possess a refractive index of 10.

When 1,100 g of the garlic paste was concentrated with a rotary evaporator under 25 Torrs at 60° C., there was obtained 150 g of non-odorous garlic paste which was found by measurement with the aforementioned refractometer to possess a refractive index of 70.

A sauce for roast meat was prepared by mixing 1.5% by weight of the aforementioned non-odorous garlic paste, 75% by weight of soy sauce, 18.5% of sugar, and 5% by weight of mirin (sweet sake) (Japanese seasoning alcohol obtained by saccharifying an intimate mixture of ethyl alcohol, koji, and glutinous rice for a brewing length of time in the presence of about 10% of alcohol). When meat soaked with this sauce was roasted, there was produced roast meat which emitted no odor of garlic but gave forth the flavor and favorable taste of garlic. Sauce for roast meat which is commercially available containing grated garlic emits intense odor of garlic. A sauce for roast meat which contained the non-odorous garlic paste obtained in the present example emitted no odor of garlic and, therefore, was found acceptable even by panel members who dislike the odor of garlic.

Separately, a garlic paste as a comparative sample was obtained by following the procedure described above, except that the treatment in the electronic oven was omitted and the addition of yeast and that of soybean flour were both omitted, and a sauce for roast meat was prepared by using this garlic paste. The roast meats prepared by using the two sauces were subjected to sensory testing. The ratings in the test were made on the following scale.

Scale of Rating (odor of garlic)

2: Intense odor of garlic perceived.
1: Strong odor of garlic perceived.
0: Odor of garlic easily perceived.
−1: Odor of garlic barely perceived.
−2: No odor of garlic perceived.

A panel of 21 members rated the roast meats as shown in the following Table 2. The roast meat using the sauce of the present invention was concluded to be free from the odor of garlic.

TABLE 2

| | Odor of Garlic* | |
|---|---|---|
| Panel Member | Roast Meat Using Sauce Containing Odorous Garlic Paste | Roast Meat Using Sauce Containing Non-Odorous Garlic Paste of This Invention |
| 1 | 0 | 0 |
| 2 | 1 | 0 |
| 3 | 0 | 0 |
| 4 | 2 | −2 |
| 5 | −1 | 0 |
| 6 | 1 | 0 |
| 7 | 0 | −2 |
| 8 | 0 | −1 |
| 9 | 1 | −1 |
| 10 | 1 | 0 |
| 11 | 0 | 0 |
| 12 | 1 | −2 |
| 13 | 0 | −2 |
| 14 | 0 | −1 |
| 15 | −1 | −2 |
| 16 | −2 | −2 |
| 17 | 1 | 0 |
| 18 | −2 | −1 |
| 19 | −1 | −1 |
| 20 | 2 | 2 |
| 21 | 0 | −2 |

*Level of significance 5%

EXAMPLE 3

In 2,500 g of boiling water, a 1,050 g bunch of garlic bulbs wrapped in the skin was boiled for 30 minutes. After the boiling, it was immediately treated with a finisher designed for squeezing juice from fruits to be divided into the unwanted portions of garlic bulbs, i.e., the skin and the roots and bottoms of garlic bulbs, a clove-containing liquid. Thus, the clove-containing liquid was obtained in an amount of 2,000 g. The clove-containing liquid and 25 g of rice bran added thereto were stirred and heated at 60° C. for 1 hour at a pH of 8. After adjusting the pH to 6, the resultant mixture was divided by centrifugal separation into solids and a liquid. The liquid was obtained in an amount of 1,000 g. This liquid and 50 g of soybean milk flour added thereto were heated and subsequently centrifuged. Consequently, there was obtained non-odorous garlic paste which, by measurement with a portable refractometer, was found to possess a refractive index of 12.

A nutritious beverage was obtained by preparing a mixture consisting of 5% by weight of the non-odorous garlic paste obtained as described above, 12% by weight of sugar, 0.5% by weight of honey, 0.5% by weight of plum juice, 0.22% by weight of citric acid, 0.15% by weight of flavor, and 81.63% by weight of water, dispersing this mixture in a unit volume of 160 ml among bottles, sealing the filled bottles, and sterilizing their contents. As compared with a commercially available garlic-containing beverage, this beverage emitted no perceptible odor of garlic, but did provide the delicious taste of garlic.

Separately, a nutritious beverage was obtained by using garlic paste prepared by following the procedure described above, except that the boiling treatment was omitted and the addition of rice bran and that of soybean flour were both omitted. The two beverages were subjected to sensory test similarly to Example 1. The results were as shown below in Table 3. It is noted from the results that the beverage of the present invention was rated more favorably than the other beverage used for comparison.

TABLE 3

| Panel Member | Odor of Garlic[1] Beverage Using Odorous Garlic Paste | Beverage Using Non-Odorous Garlic Paste |
| --- | --- | --- |
| 1 | 2 | 0 |
| 2 | 2 | 0 |
| 3 | 2 | −1 |
| 4 | 2 | 0 |
| 5 | 2 | −1 |
| 6 | 2 | 0 |
| 7 | 2 | 0 |
| 8 | 2 | 1 |
| 9 | 2 | 0 |
| 10 | 2 | 1 |
| 11 | 2 | 0 |
| 12 | 2 | 1 |
| 13 | 2 | 1 |
| 14 | 2 | 1 |
| 15 | 2 | 1 |
| 16 | 2 | 1 |
| 17 | 2 | −1 |
| 18 | 2 | −1 |

[1] Level of significance 5%

EXAMPLE 4

In 2,500 g of boiling water, a 1,000 g bunch of garlic bulbs wrapped in the skin was boiled for 30 minutes. After the boiling, the garlic was immediately treated with a finisher designed for squeezing juice from fruits, and thus divided into the unwanted portions of garlic bulbs, i.e., the skin and the roots and bottoms of garlic bulbs, and a clove-containing luquid. The clove-containing liquid was obtained in an amount of 2,000 g. The clove-containing liquid and 25 g of rice bran added thereto were stirred at 60° C. for 1 hour at a pH of 8. After adjusting the pH to 6, the resultant mixture was divided by centrifugal separation into solids and a liquid. Liquid was thus obtained in an amount of 1,000 g. Then, this liquid and 500 g of soybean milk added thereto were heated to 60° C. The resultant mixture was immediately centrifuged to obtain non-odorous garlic paste which, by measurement with a portable refractometer, was found to possess a refractive index of 8.

When this non-odorous garlic paste was freeze dried, there was obtained non-odorous powdered garlic extract in the form of a foam mat. The product thus-obtained emitted no odor, but gave forth the flavor and favorable taste of garlic.

Separately, powdered garlic was prepared as a control by repeating the procedure of the present example, except that the boiling treatment was omitted and the addition of rice bran and that of soybean milk were both omitted. The powdered garlic produced in the present example, the control powdered garlic prepared as described above, and a product of S & B Shokuhin Co., Ltd. marketed under the designation of "Garlic Powder" were severally suspended in a concentration of 5% by weight. The suspensions were placed in Erlenmeyer flasks of a volume of 150 ml, kept tightly stoppered at 37° C. for 30 minutes, and subjected to sensory testing conducted by a panel of 20 members. The ratings in this test were made on the following scale.

Scale of Rating (odor of garlic)

2: Intense odor of garlic perceived.
1: Strong odor of garlic perceived.
0: Odor of garlic easily perceived.
−1: Odor of garlic barely perceived.
−2: No odor of garlic perceived.

The results of the sensory test were as shown in the following Table 4. It is noted from the test results that no significant difference was found on a level of 5% between the commercial product and the control of the present example and significant difference was found on a level of 5% between the product of the present example and the control of the present example and between the product of the present example and the commercial product.

TABLE 4

| Panel Members | Commercial Product | Control | Product of This Example |
| --- | --- | --- | --- |
| 1 | 1 | 1 | −1 |
| 2 | 0 | 1 | −1 |
| 3 | 1 | 2 | 0 |
| 4 | 0 | 2 | −1 |
| 5 | 0 | 2 | −2 |
| 6 | 1 | 2 | 0 |
| 7 | 0 | 2 | −1 |
| 8 | 2 | 2 | 0 |
| 9 | 1 | 2 | 0 |
| 10 | 2 | 1 | −1 |
| 11 | 2 | 2 | −1 |
| 12 | 2 | 1 | 0 |
| 13 | 2 | 2 | −2 |
| 14 | 0 | 0 | 0 |
| 15 | −1 | −1 | −2 |
| 16 | 2 | 2 | 1 |
| 17 | 1 | 0 | −2 |
| 18 | 1 | 2 | 0 |
| 19 | 2 | 2 | −1 |
| 20 | 2 | 2 | −1 |

EXAMPLE 5

A 10 kg bunch of garlic bulbs wrapped in the skin was washed with cold water, placed in a gauze basket, set in place within a retort, and subjected to a heating treatment at 110° C. for 10 minutes. After the heating treatment, the garlic still held in the basket was cooled in running water and then drained. Subsequently, the garlic was dropped into 3 kg of cold water and treated with a finisher having meshes 1.5 mm in diameter to be thus divided into the unwanted portions of garlic bulbs, i.e., the skin and the roots and bottoms of garlic bulbs, and a clove-containing liquid. Thus, the clove-containing liquid was obtained in an amount of 10 kg.

The clove-containing liquid was mixed with 400 mg of hydrochloride of vitamin $B_1$. The resultant mixture was adjusted to a pH of 8 with an aqueous solution of 10% by weight of sodium hydroxide. Over a hot water bath, the mixture was stirred and heated at 60° C. for 40 minutes. The heated mixture was cooled and then adjusted to a pH of 6 with an aqueous solution of 36% by weight of hydrochloric acid. The mixture and 130,000 units of a cellulase from a microorganism of genus Aspergillus (a product of Nagase Biochemical Co., Ltd. marketed under the trademark designation "Cellulase 2000 CUN/g") added thereto were stirred over a hot water bath at 50° C. for 2 hours, causing the cellulase to react on the mixture. The resultant broth was heated at 90° C. to inactivate the enzyme consequently produced therein. At this point, the clove-containing liquid showed a viscosity of 600 cp. By measurement with a portable refractometer, the liquid was found to possess a refractive index of 25. The viscosity was determined under the conditions of 1°34" of cone angle, 10 rpm of rotational speed, and 12 seconds of rotation time. This determination was made with a viscosimeter, type E, made by Tokyo Measuring Instrument Co., Ltd.

The aforementioned clove-containing liquid and 98 g of raw soybean flour added thereto were heated to 60° C. and then treated with a homogenizer, T.K. MY Colloider, Type L. By the use of a centrifugal spray drier (maximum capacity 250 kg/hour), the liquid resulting from the treatment with the homogenizer was spray dried. The powder consequently produced emitted no odor but gave forth the flavor and favorable taste of garlic. This powder was applied to the surface of rice crackers at a rate of 2.5 g per 100 g of rice crackers in conjunction with soy sauce. The finished crackers emitted absolutely no odor, but gave forth the flavor and favorable taste of garlic.

The rice crackers and ordinary rice crackers coated with garlic powder were subjected to sensory testing similar to Example 1. The results of the test were as shown in Table 5.

TABLE 5

| | Odor of Garlic*1 | |
|---|---|---|
| Panel Member | Rice Crackers Using Odorous Garlic Powder | Rice Crackers Using Non-Odorous Garlic Powder of This Invention |
| 1 | 2 | 0 |
| 2 | 2 | 1 |
| 3 | 2 | 0 |
| 4 | 2 | 1 |
| 5 | 2 | 0 |
| 6 | 2 | 0 |
| 7 | 2 | 1 |
| 8 | 2 | 0 |
| 9 | 2 | 0 |
| 10 | 2 | 0 |
| 11 | 2 | −1 |
| 12 | 2 | 0 |
| 13 | 2 | 0 |
| 14 | 2 | 0 |
| 15 | 2 | 0 |
| 16 | 2 | −1 |
| 17 | 2 | 0 |
| 18 | 2 | 1 |

*1Level of significance 5%

EXAMPLE 6

A 1 kg bunch of garlic bulbs wrapped in the skin was placed in an electronic oven rated for 2,450 MHz of frequency and 3.5 kw of output and a glass container holding water intended to keep the oven interior saturated with steam was placed in the electronic oven. The electronic oven was operated to irradiate its contents with microwaves for 3 minutes. Then, the individual garlic bulbs so treated were manually peeled and deprived of the skin and the roots and bottoms of garlic bulbs. The remaining garlic and 1,600 g of water added thereto were stirred in a large combination juicer and mixer and converted into like a slurry. Consequently, a clove-containing liquid was obtained in an amount of 2,300 g. This liquid was mixed with 30 g of a yeast produced by microorganic culture on whey as a medium. The resultant mixture was adjusted to a pH of 8 with an aqueous solution of 10 wt% NaOH and then stirred over a hot water bath at 60° C. for 60 minutes. The heated mixture was cooled and then adjusted to a pH of 6 with an aqueous solution of 36% by weight of hydrochloric acid. This mixture and 1,230 units of a cellulase produced by Trichoderma koningi (product of Meiji Seika Kaisha, Ltd. marketed under trademark designation of "Meiselase") added thereto were stirred and heated over a hot water bath at 50° C. for 2 hours, causing the cellulase to react on the mixture. The resultant broth was heated to 90° C. to inactivate the enzyme consequently produced therein. The liquid thus produced was mixed with 9.8 g of soybean flour thermally denatured by steaming in advance. The resultant mixture was heated to 60° C. and then treated with a pressure homogenizer under pressure of 150 kg/cm$^2$ (gauge). The liquid resulting from the treatment with the homogenizer was concentrated under a vacuum of 700 mmHg/cm$^2$ (gauge) at 60° C., to give rise to non-odorous garlic paste having a refractive index of 50 and a viscosity of 2,200 cp. This garlic paste retained the flavor and favorable taste of garlic, but emitted no odor of garlic. When this garlic paste was added to "gyoza" (a ground pork-leek mixture wrapped in dough skin and baked) at a rate of 3.2 g per plate of gyoza served on 4 persons, the gyoza produced provided the flavor and favorable taste of garlic but emitted no odor of garlic.

EXAMPLE 7

A 10 kg bunch of garlic bulbs wrapped in the skin was washed with cold water, placed in a gauze basket, set in place within a retort, and subjected to a heating treatment at 120° C. for 5 minutes. The garlic resulting from the heating treatment was mixed with 3 kg of cold water and treated with a strainer made by Aikosha Co., Ltd. to be divided into the unwanted portions of garlic bulbs, i.e., the skin and the roots and bottoms of garlic bulbs, and a clove-containing liquid. Thus, the clove-containing liquid was obtained in an amount of 10 kg. This liquid was mixed with 250 g of deodorized rice bran. The resultant mixture was adjusted to a pH of 8 and then stirred and heated at 60° C. for 1 hour. The heated mixture was cooled and then adjusted to a pH of 6. The clove-containing liquid and 12,250 units of the same cellulase (i.e., Meiselase) as was used in Example 6 were stirred over a hot water bath at 50° C. for 2 hours, causing the cellulase to react on the liquid. The resultant broth was heated to 90° C. to inactivate the enzyme consequently produced therein. The resultant liquid and 98 g of soybean flour added thereto were heated to 60° C. and then homogenized under pressure of 150 kg/cm$^2$ (gauge). By freeze drying the liquid and comminuting the resultant dry mass, 2,500 g of garlic powder was obtained. When this garlic powder was added to meat buns at a rate of 0.7%, the meat buns produced gave forth the flavor and favorable taste of garlic, but emitted no odor of garlic.

COMPARATIVE EXPERIMENT 1

A powdered garlic was obtained by following the procedure of Example 5, except that the addition of vitamin $B_1$ was omitted. The powdered garlic thus produced and the powdered garlic obtained as the final product in Example 5 were subjected to sensory testing. The results of the tests were as shown in Table 6. It is noted from the test results that the odor of garlic was stronger in the sample containing no vitamin $B_1$ than the sample containing vitamin $B_1$ at a level of significance of 5%.

TABLE 6

| Panel Members | Powdered Garlic Containing No Vitamin $B_1$ | Powdered Garlic Containing Vitamin $B_1$ |
|---|---|---|
| 1 | o | x |
| 2 | o | x |
| 3 | x | o |

TABLE 6-continued

| Panel Members | Powdered Garlic Containing No Vitamin B$_1$ | Powdered Garlic Containing Vitamin B$_1$ |
| --- | --- | --- |
| 4 | o | x |
| 5 | o | x |
| 6 | o | x |
| 7 | o | x |
| 8 | o | x |
| 9 | x | o |
| 10 | o | x |
| 11 | o | x |
| 12 | x | o |
| 13 | o | x |
| 14 | x | o |
| 15 | o | x |
| 16 | o | x |
| 17 | o | x |
| 18 | x | o |
| 19 | o | x |
| 20 | o | x |
| Total of o's | 15 | 5 | o: Stronger odor of garlic, x: Weaker odor of garlic

COMPARATIVE EXPERIMENT 2

The same clove-containing liquid as obtained in Example 5 was mixed with vitamin B$_1$. The mixture was adjusted in pH level, heated, then cooled, and portions thereof were mixed with various cellulases as indicated below. Again by following the procedure of Example 5, the resultant mixture was adjusted in pH level and stirred and heated for 2 hours, causing the cellulase to react on the liquid. The relation between the amount of cellulase added (in units based on solids of clove-containing liquid) and the viscosity of the liquid is shown in FIG. 1.

Meiselase: Product of Meiji Seika Kaisha, Ltd. (origin: *Trichoderma koningi*)
Cellulase Onozuka: Product of Kinki Yakult Mfg. Co., Ltd. (origin: *Trichoderma viride*)
Cellulase 2000 CUN/g: Product of Nagase Biochemical Co., Ltd. (origin: *Aspergillus niger*)
Cellulase AP: Product of Amano Pharmaceutical Co., Ltd. (origin: genus Aspergillus)

Any of the cellulase species originating in genus Trichoderma is required to be added in an amount exceeding 5 units/g and any of the cellulase species originating in genus Aspergillus in an amount exceeding 50 units/g, respectively, based on solids of the clove-containing liquid.

COMPARATIVE EXPERIMENT 3

A clove-containing liquid was obtained by following the procedure of Example 5 as far as the steps of addition of vitamin B$_1$, stirring and heating of the mixture, and cooling of the heated mixture. Meiselase was added to one portion of the clove-containing liquid in an amount of 5 units/g and Cellulase 2000 CUN/g to another portion of the clove-containing liquid in an amount of 50 units/g. The two samples were tested for loss of viscosity over the course of time. The results of the test are shown in FIG. 2.

COMPARATIVE EXPERIMENT 4

A clove-containing liquid was obtained by following the procedure of Example 5 as far as the steps of addition of vitamin B$_1$, stirring and heating of the mixture, and cooling of the heated mixture. Meiselase was added in a fixed amount of 5 units/g to aliquots of the clove-containing liquid of varying pH value and Cellulase 2000 CUN/g in a fixed amount of 50 units/g to other aliquots of varying pH value. The samples thus prepared were tested for loss of viscosity due to pH value. The results of the test are shown in FIG. 3. It is noted from the test results that the optimum pH value for the effect of the cellulase falls in the range of from 4 to 6.

COMPARATIVE EXPERIMENT 5

A clove-containing liquid was obtained by following the procedure of Example 5 as far as the steps of addition of vitamin B$_1$, stirring and heating of the mixture, and cooling of the heated mixture. Meiselase was added in a fixed amount of 5 units/g to aliquots of the clove-containing liquid held at various temperatures and Cellulase 2000 CUN/g was added in a fixed amount of 50 units/g to other aliquots held at various temperatures. The relation between loss of viscosity and temperature was as is shown in FIG. 4. It is noted from the test results that the optimum temperature for the effect of the cellulase falls in the range of from 40° to 60° C.

COMPARATIVE EXPERIMENT 6

A clove-containing liquid was obtained by following the procedure of Example 5 as far as the step of inactivation of enzyme by the application of heat. Three aliquots of the clove-containing liquid, the first having no soybean flour added thereto, the second having soybean flour added in an amount of 4% by weight (based on solids of the clove-containing liquid), and the third having soybean flour added in an amount of 10% by weight (same as above), were processed further by following the procedure of Example 5 to provide three species of powdered garlic.

Each of the species of powdered garlic was suspended in a concentration of 5% by weight. A 20 ml portion of the suspension was placed in an Erlenmeyer flask in a volume of 100 ml and heated to 37° C. (for 30 minutes). The samples thus prepared were subjected to sensory testing conducted by a panel of 20 members. The rating in this sensory test was made on the following scale.

Scale of Rating (odor of garlic)

2: Odor of garlic easily perceived.
1: Odor of garlic barely perceived.
0: No odor of garlic perceived.

Scale of Rating (odor of soybean)

2: Odor of soybean easily perceived.
1: Odor of soybean barely perceived.
0: No odor of soybean perceived.

The results of this sensory testing were as shown in Table 7. The test results were examined for level of significance at the size of 5%, based on the value in the range determined by the Student Method, as described in the book "Handbook of Sensory Test in Manufacture" issued by J.U.S.E. Press Ltd. in Japan. The results of this examination indicate that the odor of garlic was significantly less in the sample containing 4% by weight of soybean flour than in the sample containing no soybean and that no significant difference of garlic odor existed between the sample containing 10% by weight of soybean flour and the sample containing 4% by weight of soybean flour. In the case of the odor of soybean, the results of the examination indicate that no significant difference existed between the sample containing 4% by weight of soybean flour and the sample containing no soybean flour, and that a significant difference existed between the sample containing 4% by weight of soybean flour and the sample containing 10% by weight of soybean flour.

TABLE 7

| Panel Members | Odor of Garlic | | | Odor of Soybean | | |
|---|---|---|---|---|---|---|
| | Sample Containing No Soybean Flour | Sample Containing 4% by Weight of Soybean Flour | Sample Containing 10% by Weight of Soybean Flour | Sample Containing No Soybean Flour | Sample Containing 4% by Weight of Soybean Flour | Sample Containing 10% by Weight of Soybean Flour |
| 1 | 1 | 0 | 1 | 0 | 0 | 0 |
| 2 | 2 | 1 | 0 | 1 | 2 | 2 |
| 3 | 2 | 1 | 0 | 0 | 0 | 1 |
| 4 | 1 | 0 | 0 | 1 | 2 | 2 |
| 5 | 1 | 0 | 0 | 0 | 0 | 0 |
| 6 | 1 | 1 | 0 | 0 | 0 | 2 |
| 7 | 1 | 0 | 1 | 1 | 1 | 2 |
| 8 | 0 | 0 | 0 | 0 | 0 | 1 |
| 9 | 2 | 0 | 0 | 0 | 0 | 0 |
| 10 | 2 | 0 | 1 | 0 | 0 | 2 |
| 11 | 2 | 1 | 1 | 0 | 1 | 2 |
| 12 | 1 | 1 | 0 | 0 | 0 | 0 |
| 13 | 0 | 1 | 1 | 0 | 2 | 2 |
| 14 | 2 | 0 | 0 | 1 | 1 | 2 |
| 15 | 1 | 0 | 0 | 0 | 0 | 0 |
| 16 | 2 | 1 | 0 | 1 | 2 | 2 |
| 17 | 2 | 0 | 0 | 0 | 0 | 1 |
| 18 | 1 | 0 | 0 | 0 | 0 | 0 |
| 19 | 2 | 0 | 0 | 0 | 0 | 1 |
| 20 | 1 | 1 | 1 | 0 | 0 | 1 |

From the working examples and the comparative experiments cited above, it is noted that the present invention brings about the following described effects:

(1) The non-odorous garlic paste produced in accordance with the present invention retains intact the flavor and favorable taste inherently possessed by garlic.

(2) The method of this invention successfully precludes the otherwise inevitable emission of the irritant odor of garlic, and, therefore, enables the production of non-odorous garlic paste to be carried out with better workability than the conventional methods which subject garlic bulbs directly to preponderantly physical treatments.

(3) The garlic paste obtained by the method of this invention adopting cellulase possesses a refractive index of 35 (as measured with a portable refractometer) and yet exhibits a viscosity of not more than about 1,500 cp. Thus, it can be converted into a powder or concentrated by vacuum evaporation, foam mat drying, or spray drying when desired.

While the invention has been described in detail and with reference to specific embodiments thereof, it will be apparent to one skilled in the art that various changes and modifications can be made therein without departing from the spirit and scope thereof.

What is claimed is:

1. A method for the production of garlic paste, comprising the steps of:
   (i) subjecting garlic bulbs as wrapped in the skin to a heating treatment in the range of from 99° to 120° C., adding water to said garlic bulbs in an amount by weight of from 0.3 to 2 times based on the amount of said garlic bulbs, coarsely crushing said garlic bulbs, and separating said skin and other unwanted parts of the garlic bulbs from the resultant crushed mass of garlic, leaving behind a garlic clove-containing liquid,
   (ii) heating said garlic clove-containing liquid to a temperature in the range of from 60° to 70° C. together with vitamin $B_1$ in an amount of about 0.001 to 0.005 wt% (calculated based on hydrochloride salt of vitamin $B_1$) based on the amount of garlic bulbs wrapped in the skin, rice bran in an amount of from about 0.5 to 2.5% based on the amount of garlic bulbs wrapped in the skin, or yeast in an amount of from 1 to 3% by weight based on the amount of garlic bulbs wrapped in the skin added thereto,
   (iii) optionally adding a cellulase to the product of step (ii) and heating the resultant blend at a temperature in the range of from 40° to 60° C. and at a pH of from 4 to 6, and
   (iv) heating either the liquid part of the product of step (iii) resulting from the removal of solids therefrom together with soybean flour, soybean milk, or soybean milk flour in an amount of from about 1 to about 10% by weight based on the dry weight of the clove-containing liquid or said product of step (ii) in the unmodified form thereof together with soybean flour, soybean milk, or soybean milk flour in an amount of from about 1 to about 20% by weight based on the dry weight of the clove-containing liquid.

2. A method according to claim 1, wherein said cellulase is obtained from a microorganism belonging to *Trichoderma koningi*, *Trichoderma viride* or *Aspergillus niger*.

3. A method according to claim 2, wherein said cellulase obtained from a microorganism belonging to *Trichoderma koningi* or *Trichoderma viride* is added in an amount of at least about 5 units per g of solids of said clove.

4. A method according to claim 2, wherein said cellulase obtained from a microorganism belonging to *Aspergillus niger* is added in an amount of at least about 50 units per g of solids of said clove.

* * * * *